United States Patent
Nishioka et al.

(10) Patent No.: US 9,689,296 B2
(45) Date of Patent: Jun. 27, 2017

(54) EXHAUST PURIFICATION DEVICE FOR INTERNAL COMBUSTION ENGINE

(71) Applicants: Hiromasa Nishioka, Susono (JP); Kazuhiro Itoh, Mishima (JP); Daichi Imai, Shizuoka (JP); Ryota Koutake, Kakegawa (JP)

(72) Inventors: Hiromasa Nishioka, Susono (JP); Kazuhiro Itoh, Mishima (JP); Daichi Imai, Shizuoka (JP); Ryota Koutake, Kakegawa (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 127 days.

(21) Appl. No.: 14/441,987

(22) PCT Filed: Nov. 13, 2012

(86) PCT No.: PCT/JP2012/079401
§ 371 (c)(1),
(2) Date: May 11, 2015

(87) PCT Pub. No.: WO2014/076767
PCT Pub. Date: May 22, 2014

(65) Prior Publication Data
US 2015/0292387 A1    Oct. 15, 2015

(51) Int. Cl.
*B01D 50/00* (2006.01)
*F01N 9/00* (2006.01)
(Continued)

(52) U.S. Cl.
CPC ............ *F01N 9/002* (2013.01); *F01N 3/022* (2013.01); *F01N 3/023* (2013.01); *F01N 3/0222* (2013.01);
(Continued)

(58) Field of Classification Search
CPC .......... F01N 9/002; F01N 3/023; F01N 9/005; F01N 3/0022; F01N 2510/0682; F01N 2330/60
(Continued)

(56) References Cited

U.S. PATENT DOCUMENTS 7,772,151 B2 * 8/2010 Li ...................... B01D 46/2429
502/335
2001/0026838 A1 * 10/2001 Dettling .................. B01J 23/63
427/230
(Continued)

FOREIGN PATENT DOCUMENTS

JP    2000-018019 A    1/2000
WO    2008/126331 A1    10/2008

*Primary Examiner* — Tom P Duong
(74) *Attorney, Agent, or Firm* — Andrews Kurth Kenyon LLP

(57) ABSTRACT

A particulate filter arranged in an engine exhaust passage is provided with alternately arranged exhaust gas inflow and outflow passages and porous partition walls separating these passages from each other. In each partition wall, a coated zone where a coated layer with an average pore size smaller than that of a partition wall substrate is used to cover the substrate surface and a non-coated zone downstream of the coated zone where the substrate surface is not covered by the coated layer are defined, and the ash in the exhaust gas can pass through the partition wall in the non-coated zone. The quantity of particulate matter trapped at the non-coated zones is calculated, and PM removal control for removing particulate matter from the particulate filter is performed when it is judged that the quantity of trapped particulate matter is greater than an allowable upper limit amount.

7 Claims, 10 Drawing Sheets

(51) Int. Cl.
*F01N 3/022* (2006.01)
*F01N 3/023* (2006.01)
*F01N 3/035* (2006.01)

(52) U.S. Cl.
CPC ............ *F01N 3/035* (2013.01); *F01N 9/005* (2013.01); *F01N 2330/60* (2013.01); *F01N 2510/0682* (2013.01); *F01N 2900/0408* (2013.01); *F01N 2900/1606* (2013.01); *Y02T 10/47* (2013.01)

(58) Field of Classification Search
USPC .............. 422/180; 55/523; 60/274, 299, 295
See application file for complete search history.

(56) References Cited

U.S. PATENT DOCUMENTS

| | | | |
|---|---|---|---|
| 2004/0175315 A1* | 9/2004 | Brisley | B01D 53/9431 423/239.1 |
| 2006/0057046 A1* | 3/2006 | Punke | B01D 53/944 423/215.5 |
| 2008/0241011 A1 | 10/2008 | Ohno et al. | |
| 2010/0175372 A1* | 7/2010 | Lambert | B01D 53/9472 60/297 |
| 2015/0059321 A1* | 3/2015 | Nakayama | F01N 3/035 60/297 |

* cited by examiner

EXHAUST PURIFICATION DEVICE FOR INTERNAL COMBUSTION ENGINE

CROSS-REFERENCE TO RELATED APPLICATION

This is a national phase application based on the PCT International Patent Application No. PCT/JP2012/079401 filed Nov. 13, 2012, the entire contents of which are incorporated herein by reference.

TECHNICAL FIELD

The present invention relates to an exhaust purification device for an internal combustion engine.

BACKGROUND ART

Known in the art is a compression ignition type internal combustion engine which arranges a particulate filter for trapping particulate matter in exhaust gas at the inside of an exhaust passage. As a result, the quantity of particulate matter which is discharged into the atmosphere is suppressed.

In this regard, if the quantity of particulate matter on the particulate filter becomes greater, the pressure loss of the particulate filter will gradually become greater. As a result, the engine output is liable to drop.

Therefore, known in the art is an internal combustion engine which performs PM removal control which maintains the particulate filter in an oxidizing atmosphere while making the particulate filter rise in temperature and thereby makes the particulate matter burn off from the particulate filter (see PLT 1). In this internal combustion engine, the pressure difference between the upstream and downstream sides of the particulate filter is detected and the PM removal control is performed when the pressure difference becomes a predetermined upper limit value or more.

CITATIONS LIST

Patent Literature

PLT 1: Japanese Patent Publication No. 2000-018019 A

SUMMARY OF INVENTION

Technical Problem

In this regard, exhaust gas contains nonburnable ingredients called "ash". This ash is trapped together with the particulate matter at the particulate filter. In this regard, even if PM removal processing is performed, the ash will not burn or vaporize, but will remain on the particulate filter. For this reason, as the engine operating time becomes longer, the quantity of ash on the particulate filter will gradually increase and the pressure loss of the particulate filter will gradually become larger. As a result, even if the PM removal processing is repeatedly performed, the engine output is liable to drop.

In the above-mentioned PLT 1, this problem is not considered at all much less is a solution disclosed.

Solution to Problem

According to the present invention, there is provided an exhaust purification device for an internal combustion engine which is provided with a particulate filter which is arranged inside of an engine exhaust passage for trapping particulate matter which is contained in exhaust gas, which particulate filter is provided with alternately arranged exhaust gas inflow passages and exhaust gas outflow passages and porous partition walls which separate these exhaust gas inflow passages and exhaust gas outflow passages from each other, wherein in each partition wall, a coated zone where a coated layer with an average pore size which is smaller than the average pore size of a partition wall substrate is used to cover the substrate surface and a non-coated zone at the downstream side of the coated zone and where the substrate surface is not covered by the coated layer are defined, and wherein the pore size of each partition wall is set so that the ash which is contained in the exhaust gas can pass through the partition wall in the non-coated zone, a first calculating means for calculating the quantity of particulate matter which is trapped at the non-coated zones, a first judging means for judging if a quantity of particulate matter which is trapped at the non-coated zones is greater than a first allowable upper limit amount, and a PM removing means for performing PM removal control which removes particulate matter from the particulate filter when it is judged that the quantity of particulate matter which is trapped at the non-coated zones is greater than the first allowable upper limit amount.

Preferably, the first calculating means uses a quantity of particulate matter which flows into the particulate filter, a particulate matter trapping rate of the coated zones, and a particulate matter trapping rate of the non-coated zones as the basis to calculate the quantity of particulate matter which is trapped at the non-coated zones.

Preferably, the device is further provided with a second calculating means for calculating the quantity of particulate matter which is trapped at the coated zones, a second judging means for judging if the quantity of particulate matter which is trapped at the coated zones is greater than a second allowable upper limit amount, and a second PM removing means for performing PM removal control when it is judged that the quantity of particulate matter which is trapped at the coated zones is greater than the second allowable upper limit amount. More preferably, the second calculating means uses the quantity of particulate matter which flows into the particulate filter and the particulate matter trapping rate of the coated zones as the basis to calculate the quantity of particulate matter which is trapped at the coated zones.

Preferably, the coated layers are formed from metal particles which have an oxidation function.

Preferably, an average pore size of the partition wall substrates is set to 25 μm to 100 μm.

Preferably, an average size of particles which form the coated layers is set to 1 μm to 10 μm.

Advantageous Effects of Invention

It is possible to reliably trap particulate matter while suppressing an increase of the pressure loss of the particulate filter due to ash.

DESCRIPTION OF EMBODIMENTS

Figure 1:
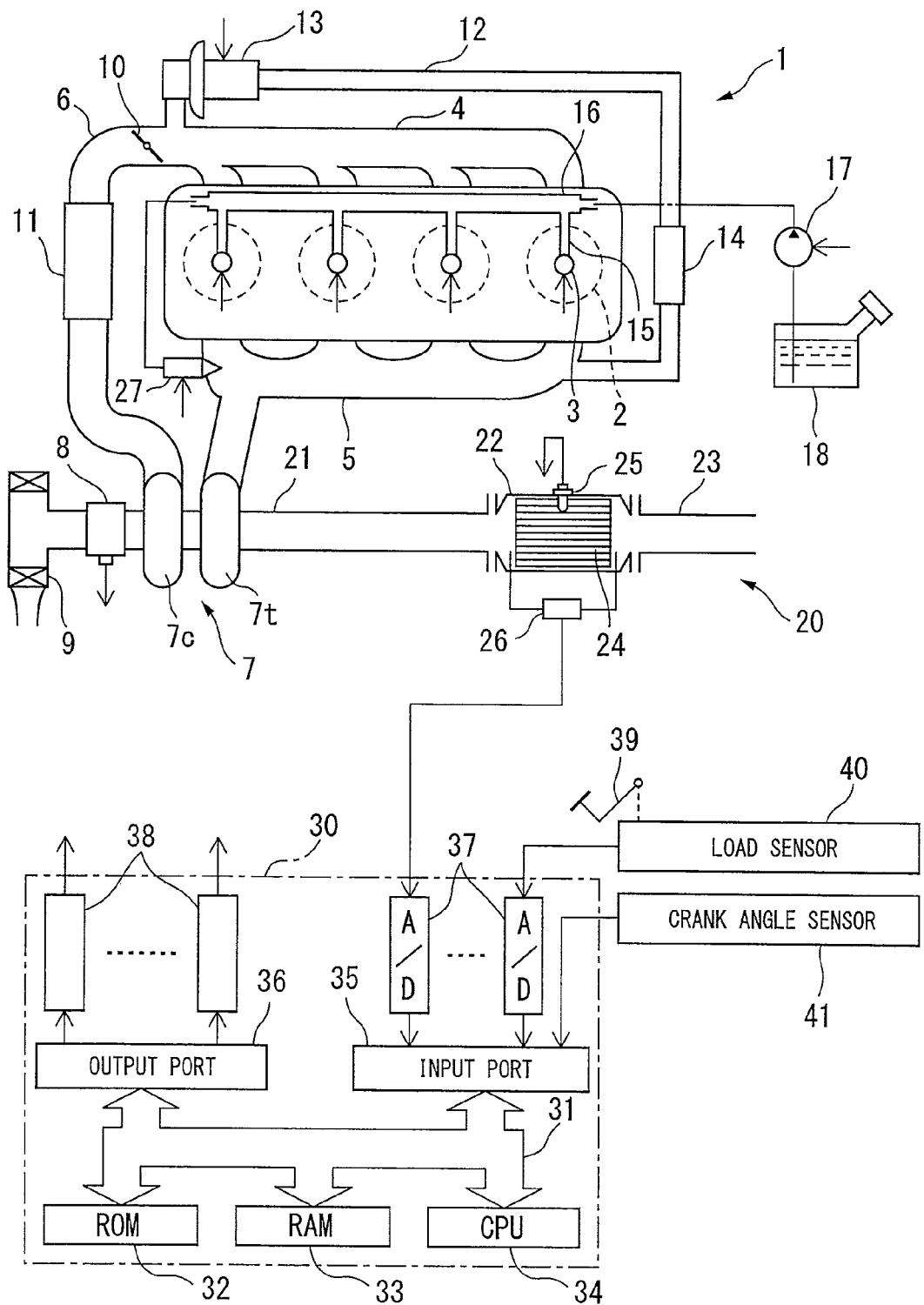
FIG. 1 is an overview of an internal combustion engine of an embodiment according to the present invention.

Referring to FIG. 1, 1 indicates a body of a compression ignition type internal combustion engine, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to an outlet of a compressor 7c of an exhaust turbocharger 7, while the inlet of the compressor 7c is connected through an air flowmeter 8 to an air cleaner 9. Inside the intake duct 6, an electrical control type throttle valve 10 is arranged. Furthermore, around the intake duct 6, a cooling device 11 is arranged for cooling the intake air which flows through the intake duct 6. On the other hand, the exhaust manifold 5 is connected to an inlet of the exhaust turbine 7t of the exhaust turbocharger 7, while an outlet of the exhaust turbine 7t is connected to an exhaust post treatment device 20.

The exhaust manifold 5 and the intake manifold 4 are connected with each other through an exhaust gas recirculation (hereinafter referred to as "EGR") passage 12. Inside the EGR passage 12, an electrical control type EGR control valve 13 is arranged. Further, around the EGR passage 12, a cooling device 14 is arranged for cooling the EGR gas which flows through the inside of the EGR passage 12. On the other hand, each fuel injector 3 is connected through a fuel runner 15 to a common rail 16. This common rail 16 is supplied with fuel from an electronically controlled type of variable discharge fuel pump 17. The fuel which is supplied into the common rail 16 is fed through fuel runners 15 to the fuel injectors 3. In the embodiment which is shown in FIG. 1, this fuel is comprised of diesel fuel. In another embodiment, the internal combustion engine is comprised of a spark ignition type internal combustion engine. In this case, the fuel is comprised of gasoline.

The exhaust post-treatment device 20 is provided with an exhaust pipe 21 which is connected to the outlet of the exhaust turbine 7t, a catalytic converter 22 which is connected to the exhaust pipe 21, and an exhaust pipe 23 which is connected to the catalytic converter 22. Inside the catalytic converter 22, a wall flow type particulate filter 24 is arranged.

The catalytic converter 22 is provided with a temperature sensor 25 for detecting the temperature of the particulate filter 24. In another embodiment, a temperature sensor for detecting the temperature of the exhaust gas which flows into the particulate filter 24 is arranged in the exhaust pipe 21. In still another embodiment, a temperature sensor for detecting the temperature of the exhaust gas which flows out from the particulate filter 24 is arranged in the exhaust pipe 23. These temperatures of the exhaust gas express the temperature of the particulate filter 24.

The catalytic converter 22 is further provided with a pressure loss sensor 26 for detecting a pressure loss of the particulate filter 24. In the embodiment which is shown in FIG. 1, the pressure loss sensor 26 is comprised of a pressure difference sensor for detecting the pressure difference between the upstream and downstream sides of the particulate filter 24. In another embodiment, the pressure loss sensor 26 is comprised of a sensor which is attached to the exhaust pipe 21 and detects an engine back pressure.

On the other hand, at the exhaust manifold 5, a fuel adding valve 27 is attached. Fuel is supplied to this fuel adding valve 27 from the common rail 16. Fuel is added from the fuel adding valve 27 to the inside of the exhaust manifold 5. In another embodiment, the fuel adding valve 27 is arranged in the exhaust pipe 21.

The electronic control unit 30 is comprised of a digital computer which is provided with components which are connected with each other by a bidirectional bus 31 such as a ROM (read only memory) 32, RAM (random access memory) 33, CPU (microprocessor) 34, input port 35, and output port 36. Output signals of the air flowmeter 8, temperature sensor 25, and pressure difference sensor 26 are input through corresponding AD converters 37 to the input port 35. Further, an accelerator pedal 39 is connected to a load sensor 40 which generates an output voltage proportional to the quantity of depression of the accelerator pedal 39. The output voltage of the load sensor 40 is input through a corresponding AD converter 37 to the input port 35. Furthermore, a crank angle sensor 41 which generates an output pulse each time the crankshaft rotates by for example 30 degrees is connected to the input port 35. At the CPU 34, the output pulses from the crank angle sensor 41 are used as the basis to calculate the engine speed Ne. On the other hand, the output port 36 is connected through corresponding drive circuits 38 to the fuel injectors 3, a drive device of the throttle valve 10, EGR control valve 13, fuel pump 17, and fuel adding valve 27.

Figure 2A:
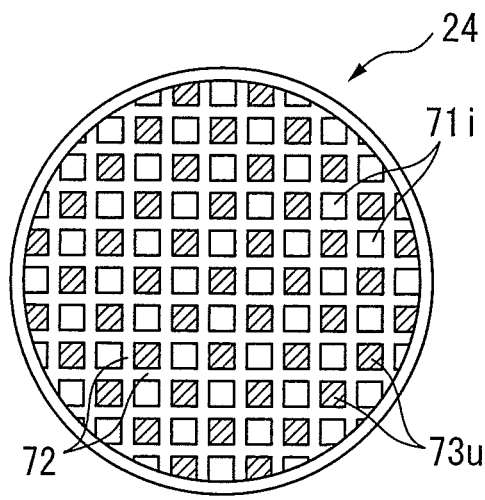
FIG. 2A is a front view of a particulate filter.
Figure 2B:
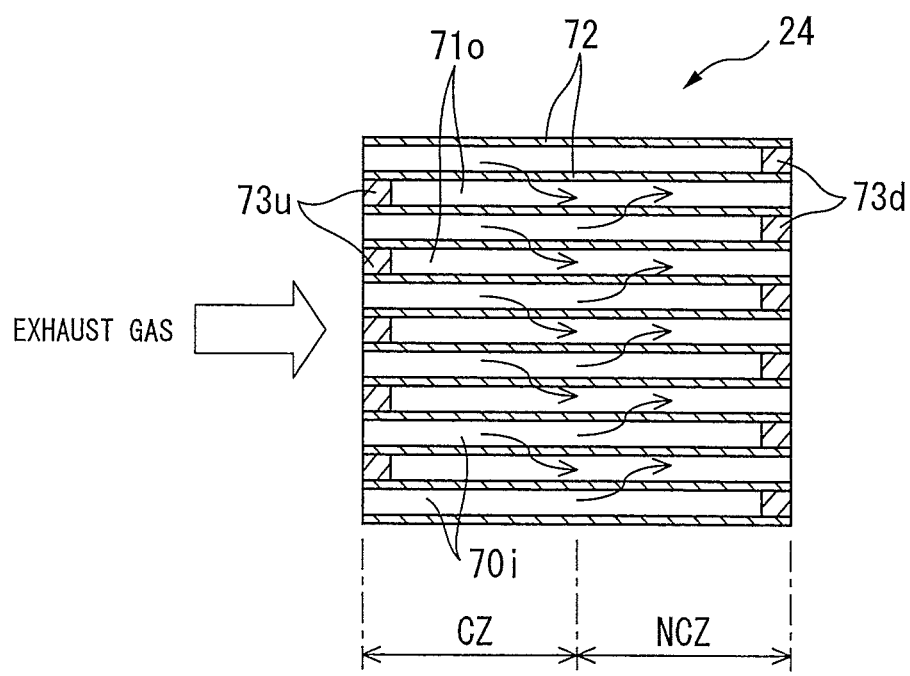
FIG. 2B is a side cross-sectional view of a particulate filter.

FIG. 2A and FIG. 2B show the structure of a wall flow type particulate filter 24. Note that, FIG. 2A shows a front view of the particulate filter 24, while FIG. 2B shows a side cross-sectional view of the particulate filter 24. As shown in FIG. 2A and FIG. 2B, the particulate filter 24 forms a honeycomb structure which is provided with plurality of exhaust flow paths 71*i* and 71*o* which extend in parallel with each other and partition walls 72 which separate these exhaust flow paths 71*i* and 71*o* from each other. In the embodiment which is shown in FIG. 2A, the exhaust flow paths 71*i* and 71*o* are comprised of exhaust gas inflow passages 71*i* with upstream ends which are open and with downstream ends which are closed by stoppers 73*d* and exhaust gas outflow passages 71*o* with upstream ends which are closed by stoppers 73*u* and with downstream ends which are open. Note that the hatched parts in FIG. 2A show the stoppers 73*u*. Therefore, the exhaust gas inflow passages 71*i* and exhaust gas outflow passages 71*o* are alternately arranged via thin partition walls 72. In other words, the exhaust gas inflow passages 71*i* and exhaust gas outflow passages 71*o* are arranged so that each exhaust gas inflow passage 71*i* is surrounded by four exhaust gas outflow passages 71*o* and each exhaust gas outflow passage 71*o* is surrounded by four exhaust gas inflow passages 71*i*. In another embodiment, the exhaust flow path is comprised of exhaust gas inflow passages with upstream ends and downstream ends which are open and exhaust gas outflow passages with upstream ends which are closed by stoppers and with downstream ends which are open.

Figure 3:
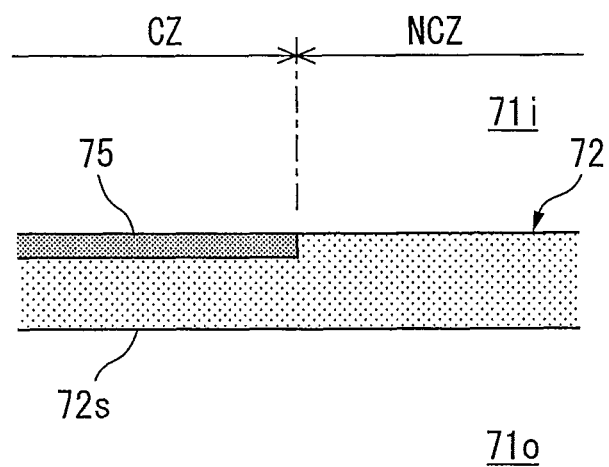
FIG. 3 is a partial enlarged cross-sectional view of a partition wall.

As shown in FIG. 2B, in the partition walls 72, coated zones CZ and non-coated zones NCZ which are positioned at the downstream sides of the coated zones CZ, are defined. As shown in FIG. 3, at each coated zone CZ, the surface of the substrate 72*s* of the partition wall 72 is covered by a coated layer 75. As opposed to this, at each non-coated zone NCZ, the surface of the substrate 72*s* of the partition wall 72 is not covered by the above-mentioned coated layer 75.

In the embodiment which is shown in FIG. 3, the coated layer 75 is provided at the one surface of the partition wall substrate 72*s* which faces the exhaust gas inflow passage 71*i*. In another embodiment, the coated layer 75 is provided at the one surface of the partition wall substrate 72*s* which faces the exhaust gas outflow passage 71*o*. In still another embodiment, the coated layer 75 is provided at both surfaces of the partition wall substrate 72*s* which face the exhaust gas inflow passage 71*i* and exhaust gas outflow passage 71*o*.

Further, in the embodiment which is shown in FIG. 3, the partition wall substrate 72*s* at the coated zone CZ is thinner than the partition wall substrate 72*s* at the non-coated zone NCZ and the thickness of the partition wall 72 at the coated zone CZ and the thickness of the partition wall 72 at the non-coated zone NCZ is substantially equal to each other. Therefore, the flow area of the exhaust gas inflow passage 71*i* at the coated zone CZ and the flow area of the exhaust gas inflow passage 71*i* at the non-coated zone NCZ are substantially equal to each other. In another embodiment, the thickness of the partition wall substrate 72*s* at the coated zone CZ and the thickness of the partition wall substrate 72*s* at the non-coated zone NCZ is substantially equal and the flow area of the exhaust gas inflow passage 71*i* at the coated zone CZ is smaller than the flow area of the exhaust gas inflow passage 71*i* at the non-coated zone NCZ by the amount of the coated layer 75.

Furthermore, in the embodiment which is shown in FIG. 2B, the upstream edges of the coated zones CZ substantially match the upstream ends of the partition walls 72. In another embodiment, the upstream edges of the coated zones CZ are positioned at the downstream sides from the upstream ends of the partition walls 72. Further, in the embodiment which is shown in FIG. 2B, the downstream edges of the non-coated zones NCZ substantially match the downstream ends of the partition walls 72. In another embodiment, the downstream edges of the non-coated zones NCZ are positioned at the upstream sides from the downstream ends of the partition walls 72.

The longitudinal direction lengths of the coated zones CZ are set to, for example, 50% to 90% of the longitudinal direction lengths of the particulate filter 24.

The partition wall substrates 72*s* are formed from a porous material, for example, cordierite, silicon carbide, silicon nitride, zirconia, titania, alumina, silica, mullite, lithium aluminum silicate, zirconium phosphate, and other such ceramics.

Figure 4:
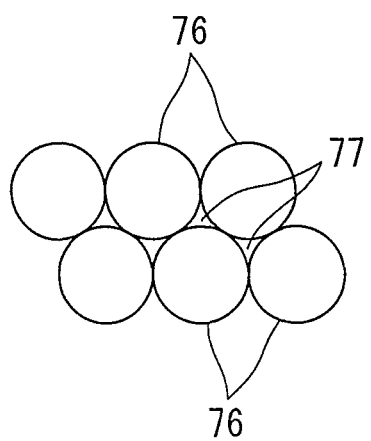
FIG. 4 is a partial enlarged cross-sectional view of a coated layer.

On the other hand, each coated layer 75, as shown in FIG. 4, is formed from a large number of particles 76 and has a large number of clearances or pores 77 between the particles 76. Therefore, the coated layer 75 has porosity. Therefore, as shown in FIG. 2B by the arrows, the exhaust gas first flows into the exhaust gas inflow passages 71*i*, then passes through the surrounding partition walls 72 and flows out into the adjoining exhaust gas outflow passages 71*o*.

In the embodiment which is shown in FIG. 4, the particles 76 are comprised of a metal which has an oxidation function. As the metal which has an oxidation function, platinum Pt, rhodium Rh, palladium Pd, or other such platinum group metals can be used. In another embodiment, the particles 76 are comprised of a ceramic similar to the partition wall substrates 72*s*. In still another embodiment, the particles 76 are comprised of one or both of a ceramic and a metal.

The average pore size of the partition wall substrates 72*s* is set to 25 μm to 100 μm. The fact that the majority of the ash which is contained in the exhaust gas can pass through the partition walls 72 if the average pore size of the partition wall substrates 72*s* is 25 μm or more was confirmed by the present inventors. Therefore, in other words, the pore size of the partition walls 72 is set so that the ash which is contained in the exhaust gas can pass through the partition walls 72 in the non-coated zones NCZ. Note that, considering the fact that the average particle size of the particulate matter is smaller than the average particle size of the ash, it is also possible to view the pore size of the partition walls 72 as being set so as to enable the particulate matter and the ash to pass through the partition walls 72 in the non-coated zones NCZ.

The average pore size of the coated layers 75 is set smaller than the average pore size of the partition wall substrates 72*s*. Specifically, the average pore size of the coated layers 75 is set so that the coated layers 75 can trap the particulate matter which is contained in the exhaust gas. Furthermore, the average size of the particles 76 (secondary particles) is set to 1 μm to 10 μm. If the average size of the particles 76 is smaller than 1 μm, the quantity of particulate matter which passes through the coated layers 75 becomes larger than the allowable amount. Further, if the average size of the particles 76 is larger than 10 μm, the pressure loss of the particulate filter 24 or coated layers 75 becomes larger than the allowable value.

Note that, in the embodiment according to the present invention, the average size of the pores of the partition wall substrates means the median size (50% size) of the pore size distribution which is obtained by the mercury intrusion method, while the average size of particles means the median size (50% size) of the particle size distribution based on volume which is obtained by the laser diffraction and scattering method.

Now then, exhaust gas contains particulate matter which is mainly formed from solid carbon. This particulate matter is trapped on the particulate filter 24.

Further, exhaust gas also contains ash. This ash is also trapped together with the particulate matter at the particulate filter 24. The fact that this ash is mainly formed from a calcium salt such as calcium sulfate $CaSO_4$ or calcium zinc phosphate $Ca_{19}Zn_2(PO_4)_{14}$ was confirmed by the present inventors. The calcium Ca, zinc Zn, phosphorus P, etc. are derived from the engine lubricating oil, while the sulfur S is derived from the fuel. That is, if explaining calcium sulfate $CaSO_4$ as an example, the engine lubricating oil flows into the combustion chambers 2 where it is burned. The calcium Ca in the lubricating oil bonds with the sulfur S in the fuel, whereby calcium sulfate $CaSO_4$ is produced.

According to the present inventors, it was confirmed that when arranging a conventional particulate filter with an average pore size of 10 μm to 25 μm or so and not provided with coated layers 75, in other words, a particulate filter through which ash does not pass much at all, inside the engine exhaust passage, the particulate matter will tend to build up at the upstream side parts of the partition walls 72 rather than the downstream side parts of the partition walls 72 and that the ash will tend to build up at the downstream side parts of the partition walls 72 rather than the upstream side parts of the partition walls 72.

Therefore, in the embodiment according to the present invention, the coated zones CZ are provided at the upstream sides of the partition walls 72 and the non-coated zones NCZ are provided at the downstream sides of the partition walls 72. As a result, the particulate matter is trapped at the coated layers 75 at the upstream side coated zones CZ, and the ash passes through the partition walls 72 at the downstream side non-coated zones NCZ. Therefore, it is possible to suppress the passage of the particulate matter through the particulate filter 24 while suppressing the buildup of the ash at the particulate filter 24. In other words, it is possible to reliably trap the particulate matter while suppressing an increase of the pressure loss of the particulate filter 24 due to the ash.

In the combustion chambers 2, fuel is burned under an excess of oxygen. Therefore, insofar as fuel is not secondarily fed from the fuel injectors 3 and the fuel adding valve 27, the particulate filter 24 will be in an oxidizing atmosphere. Further, the coated layers 75 are comprised of a metal which has an oxidation function. As a result, the particulate matter which is trapped at the coated layers 75 is successively oxidized. In this regard, if the quantity of particulate matter which is trapped per unit time becomes greater than the quantity of particulate matter which is oxidized per unit time, the quantity of particulate matter which is trapped on the particulate filter 24 will increase along with the elapse of the engine operating time.

FIG. 5A to FIG. 5E show the trapping mechanism of the particulate filter 24 in the case where the quantity of particulate matter which is trapped on the particulate filter 24 increases together with the elapse of the engine operating time.

Figure 5A:
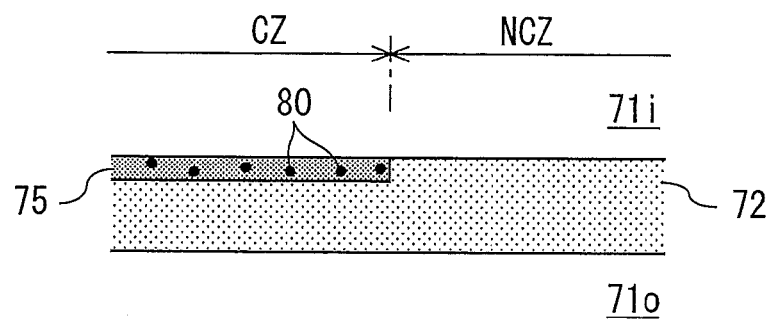
FIG. 5A is a schematic view which explains a trapping mechanism of the particulate filter.

When the engine operating time is short, that is, at the initial period of engine operation, as shown in FIG. 5A, the particulate matter 80 is mainly trapped inside the pores of the coated layers 75 in the coated zones CZ. In this case, the particulate matter does not reach the non-coated zones NCZ much at all. Note that, the state of zero engine operating time corresponds to the state where the particulate filter 24 has not yet been used. As the engine operating time elapses, the quantity of particulate matter which is trapped inside the pores of the coated layers 75 increases.

Figure 5B:
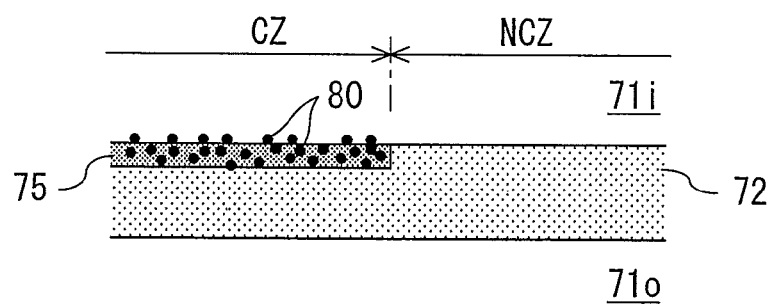
FIG. 5B is a schematic view which explains the trapping mechanism of the particulate filter.

When the engine operating time further elapses, as shown in FIG. 5B, the particulate matter 80 is mainly trapped on the surfaces of the coated layers 75. As the engine operating time further elapses, the quantity of particulate matter which is trapped on the surfaces of the coated layers 75 increases.

Figure 5C:
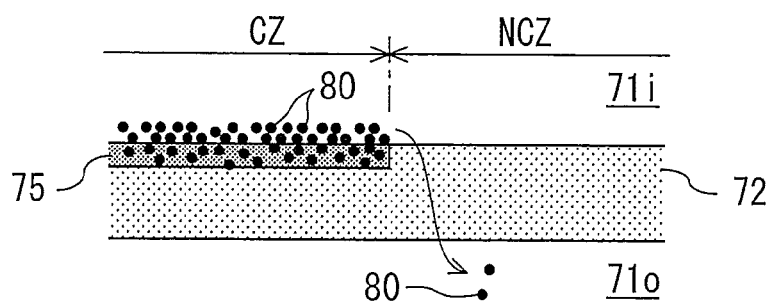
FIG. 5C is a schematic view which explains the trapping mechanism of the particulate filter.

When the engine operating time further elapses, as shown in FIG. 5C, the particulate matter 80 reaches the non-coated zones NCZ and passes through the partition walls 72. At this time, the quantity of particulate matter which is trapped at the coated zones CZ will not increase much at all.

Figure 5D:
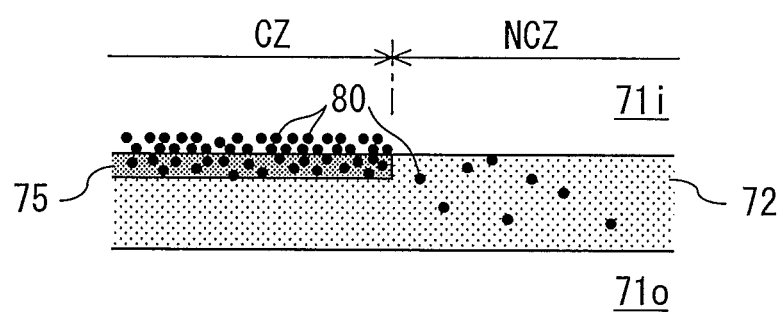
FIG. 5D is a schematic view which explains the trapping mechanism of the particulate filter.

When the engine operating time further elapses, part of the particulate matter which reaches the non-coated zones NCZ strikes the wall surfaces inside the pores of the partition walls 72 and is trapped inside the pores of the partition walls 72. That is, as shown in FIG. 5D, the particulate matter 80 is mainly trapped in the pores of the partition walls 72 at the non-coated zones NCZ. As the engine operating time further elapses, the quantity of particulate matter which is trapped inside the pores of the partition walls 72 at the non-coated zones NCZ increases.

Figure 5E:
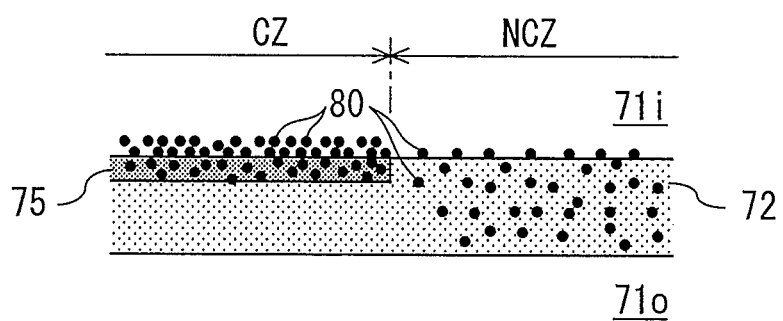
FIG. 5E is a schematic view which explains the trapping mechanism of the particulate filter.

When the engine operating time further elapses, as shown in FIG. 5E, the particulate matter 80 is mainly trapped on the surfaces of the partition walls 72 at the non-coated zones NCZ. As the engine operating time further elapses, the quantity of particulate matter which is trapped on the surfaces of the partition walls 72 at the non-coated zones NCZ increases.

Furthermore, according to the inventors, it was confirmed that when the intake air amount is large, the quantity of particulate matter which reaches the non-coated zones NCZ without being trapped at the coated zones CZ becomes greater. Therefore, when the intake air amount is large, even if the quantity of particulate matter which is trapped at the coated zones CZ is small, the quantity of particulate matter which is trapped at the non-coated zones NCZ increases.

In this regard, if the quantity of particulate matter which is trapped at the non-coated zones NCZ becomes excessive, it becomes difficult for the ash to pass through the non-coated zones NCZ. If the ash cannot pass through the non-coated zones NCZ, a large amount of ash is liable to deposit at non-coated zones NCZ.

Therefore, in the embodiment according to the present invention, the quantity of particulate matter QPMNCZ which is trapped at the non-coated zones NCZ is calculated. Next, it is judged if the particulate matter trapped quantity QPMNCZ of the non-coated zones NCZ is greater than a first allowable upper limit amount QPMNCZU. When it is judged that the particulate matter trapped quantity QPMNCZ of the non-coated zones NCZ is greater than the first allowable upper limit amount QPMNCZU, PM removal control is performed for removing the particulate matter from the particulate filter 24. As a result, the quantity of particulate matter which is trapped at the non-coated zone NCZ is decreased and therefore the ash can easily pass through the non-coated zones NCZ.

In the embodiment according to the present invention, furthermore, the quantity of particulate matter QPMCZ which is trapped at the coated zones CZ is calculated. Next, it is judged if the particulate matter trapped quantity QPMCZ of the coated zones CZ is greater than a second allowable upper limit amount QPMCZU. When it is judged that the particulate matter trapped quantity QPMZC of the coated zones CZ is larger than the second allowable upper limit amount QPMCZU, PM removal control is performed to remove the particulate matter from the particulate filter 24. As a result, the quantity of particulate matter which is trapped at the coated zones CZ is decreased and the quantity of particulate matter which passes through the coated zones CZ and reaches the non-coated zones NCZ is reduced.

Figure 6:
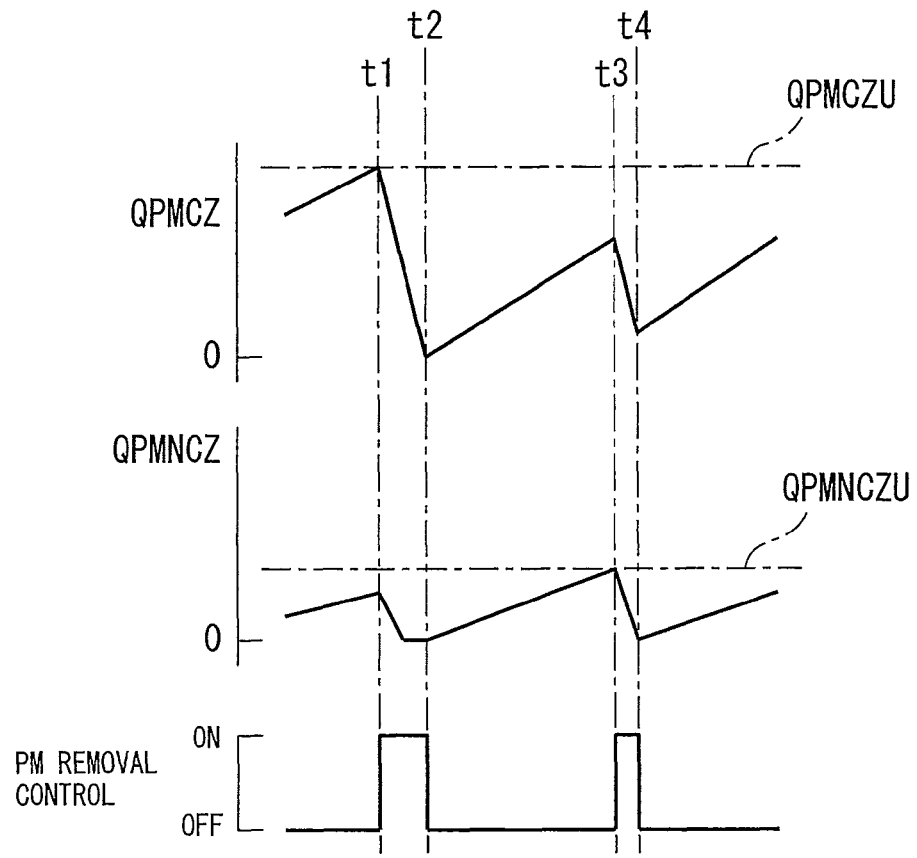
FIG. 6 is a time chart which explains an embodiment according to the present invention.

That is, as shown in FIG. 6, at the time t1, if the particulate matter trapped quantity QPMCZ of the coated zones CZ becomes greater than the second allowable upper limit amount QPMCZU, PM removal control is started even if the particulate matter trapped quantity QPMNCZ of the non-coated zones NCZ is not larger than the first allowable upper limit amount QPMNCZU. As a result, the particulate matter trapped quantity QPMCZ of the coated zones CZ and the particulate matter trapped quantity QPMNCZ of the non-coated zones NCZ respectively decrease. Next, at the time t2, PM removal control is stopped if the particulate matter trapped quantity QPMCZ of the coated zones CZ becomes substantially zero.

If PM removal control is stopped, the particulate matter trapped quantity QPMCZ of the coated zones CZ and the particulate matter trapped quantity QPMNCZ of the non-coated zones NCZ respectively increase. Next, at the time t3, if the particulate matter trapped quantity QPMNCZ of the non-coated zones NCZ becomes greater than the first allowable upper limit amount QPMNCZU, PM removal control is started even if the particulate matter trapped quantity QPMCZ of the coated zones CZ is not larger than the second allowable upper limit amount QPMCZU. As a result, the particulate matter trapped quantity QPMCZ of the coated zones CZ and the particulate matter trapped quantity QPMNCZ of the non-coated zones NCZ respectively decrease. Next, at the time t4, if the particulate matter trapped quantity QPMNCZ of the non-coated zones NCZ becomes substantially zero, the PM removal control is stopped even if the particulate matter trapped quantity QPMCZ of the coated zones CZN is not substantially zero.

That is, in the embodiment which is shown in FIG. 6, when PM removal control is started due to the particulate matter trapped quantity QPMCZ of the coated zones CZ exceeding the second allowable upper limit amount QPMCZU, the PM removal control is stopped when the particulate matter trapped quantity QPMCZ of the coated zones CZ becomes substantially zero. Further, when the PM removal control is started due to the particulate matter trapped quantity QPMNCZ of the non-coated zones NCZ exceeding the first allowable upper limit amount QPMNCZU, the PM removal control is stopped when the particulate matter trapped quantity QPMNCZ of the non-coated zones NCZ becomes substantially zero.

In another embodiment, if both of the particulate matter trapped quantity QPMCZ of the coated zones CZ and the particulate matter trapped quantity QPMNCZ of the non-coated zones NCZ become substantially zero, the PM removal control is stopped. In still another embodiment, if either of the particulate matter trapped quantity QPMCZ of the coated zones CZ and the particulate matter trapped quantity QPMNCZ of the non-coated zones NCZ becomes substantially zero, the PM removal control is stopped.

The quantity of particulate matter QPMCZ which is trapped at the coated zones CZ is repeatedly updated by using the following formula (1).

$$QPMCZ = QPMCZ + qPMi \cdot EPMCZ - qPMCZd \quad (1)$$

In formula (1), qPMi indicates the quantity of particulate matter which flows into the particulate filter 24 or coated zones CZ per unit time, EPMCZ indicates the particulate matter trapping rate of the coated zones CZ, and qPMCZd indicates the quantity of particulate matter which is removed from the coated zones CZ per unit time. Therefore, qPMi·EPMCZ indicates the increase per unit time of the particulate matter trapped quantity QPMCZ, while qPMCZd indicates the decrease per unit time of the particulate matter trapped quantity QPMCZ.

Figure 7:
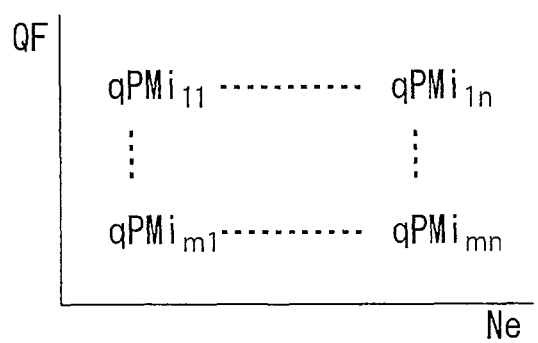
FIG. 7 is a map which shows a particulate matter inflow quantity qPMi.

In the embodiment according to the present invention, the particulate matter inflow quantity qPMi is calculated based on the engine operating state. That is, the particulate matter inflow quantity qPMi is stored as a function of the fuel injection quantity QF which expresses the engine load and the engine speed Ne in the form of the map which is shown in FIG. 7 in advance in the ROM 32 and is calculated using this map. In another embodiment, a particulate matter sensor which is attached to the exhaust passage upstream of the particulate filter 24 is used to detect the particulate matter inflow quantity qPMi.

Figure 8:
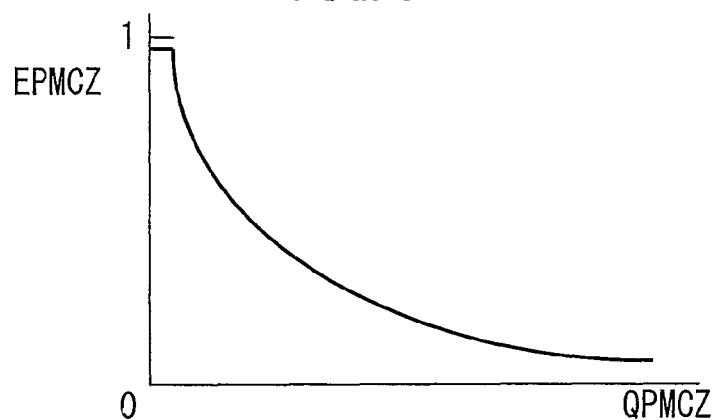
FIG. 8 is a map which shows a particulate matter trapping rate EPMCZ of the coated zones.

The particulate matter trapping rate EPMCZ of the coated zone CZ is the ratio of the quantity of particulate matter which is trapped at the coated zones CZ to the quantity of particulate matter which flows into the coated zones CZ ($0 \leq EPMCZ \leq 1$). In the embodiment according to the present invention, the particulate matter trapping rate EPMCZ of the coated zones CZ is stored as a function of the particulate matter trapped quantity QPMCZ of the coated zones CZ in the form of the map which is shown in FIG. 8 in advance in the ROM 32 and is calculated using this map. In FIG. 8, the particulate matter trapping rate EPMCZ of the coated zones CZ is made smaller as the particulate matter trapped quantity QPMCZ becomes larger except when the particulate matter trapped quantity QPMCZ is extremely small.

Figure 9:
FIG. 9 is a map which shows a decrease qPMCZd of the particulate matter trapped quantity of the coated zones.

The decrease qPMCZd per unit time of the particulate matter trapped quantity QPMCZ of the coated zones CZ is calculated based on the engine operating state. That is, the decrease qPMCZd is stored as a function of the intake air amount Ga and the temperature TF of the particulate filter 24 in the form of the map which is shown in FIG. 9 in advance in the ROM 32 and is calculated using this map.

On the other hand, the quantity of particulate matter QPMNCZ of the non-coated zones NCZ is repeatedly updated using the following formula (2).

$$QPMNCZ = QPMNCZ + qPMi \cdot (1 - EPMCZ) \cdot EPMNCZ - qPMNCZd \quad (2)$$

In formula (2), EPMNCZ indicates the particulate matter trapping rate of the non-coated zones NCZ, while qPMNCZd indicates the quantity of particulate matter which is removed from the non-coated zones NCZ per unit time. Therefore, qPMi·(1−EPMCZ) represents the quantity of particulate matter which passes through the coated zones CZ and flows into the non-coated zones NCZ. qPMi·(1−EPMCZ)·EPMNCZ indicates the increase per unit time of the particulate matter trapped quantity QPMNCZ, while qPMNCZd indicates the decrease per unit time of the particulate matter trapped quantity QPMCZ.

Figure 10:
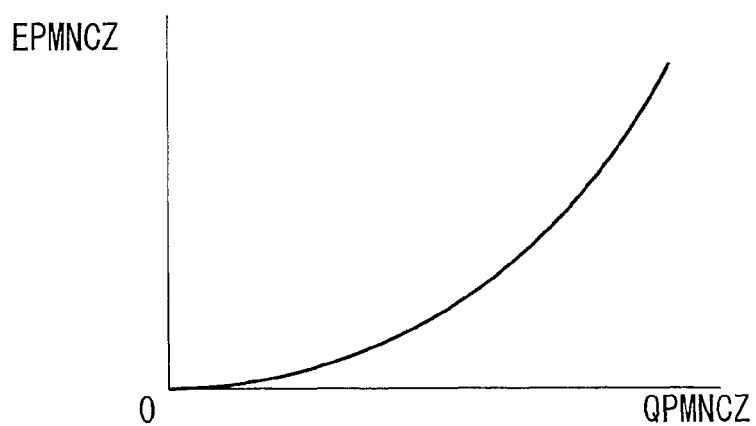
FIG. 10 is a map which shows a particulate matter trapping rate EPMNCZ of the non-coated zones.

The particulate matter trapping rate EPMNCZ is the ratio of the quantity of particulate matter which is trapped at the non-coated zones NCZ with respect to the quantity of particulate matter which flows into the non-coated zones NCZ ($0 \leq EPMNCZ \leq 1$). In the embodiment according to the present invention, the particulate matter trapping rate EPMNCZ of the non-coated zones NCZ is stored as a function of the particulate matter trapped quantity QPMNCZ of the non-coated zones NCZ in the form of the map which is shown in FIG. 10 in advance in the ROM 32 and is calculated using this map. In FIG. 10, the particulate matter trapping rate EPMNCZ of the non-coated zones NCZ becomes larger as the particulate matter trapped quantity QPMNCZ of the non-coated zones NCZ becomes greater.

Figure 11:
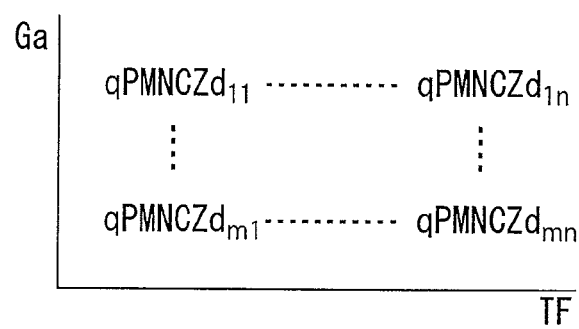
FIG. 11 is a map which shows a decrease qPMNCZd of the particulate matter trapped quantity of the non-coated zones.

The decrease qPMCZd per unit time of the particulate matter trapped quantity QPMCZ of the coated zones CZ is calculated based on the engine operating state. That is, the decrease qPMCZd is stored as a function of the intake air amount Ga and the temperature TF of the particulate filter 24 in the form of the map which is shown in FIG. 11 and is calculated using this map.

Therefore, the particulate matter trapped quantity QPMCZ of the coated zone CZ is calculated based on the quantity of particulate matter qPMi which flows into the particulate filter 24 and the particulate matter trapping rate EPMCZ of the coated zones CZ. Further, the particulate matter trapped quantity QPMNCZ of the non-coated zones NCZ is calculated based on the quantity of particulate matter qPMi which flows into the particulate filter 24, the particulate matter trapping rate EPMCZ of the coated zones CZ, and the particulate matter trapping rate EPMNCZ of the non-coated zones NCZ.

In the embodiment according to the present invention, the PM removal control is comprised of temperature raising control which makes the temperature of the particulate filter 24 rise to the PM removal temperature under an oxidizing atmosphere. The PM removal temperature TPM is, for example, 600° C. In temperature raising control, the particulate matter which was trapped in the particulate filter 24 is removed by oxidation. To make the particulate filter 24 rise in temperature, in the embodiment according to the present invention, fuel which is added from the fuel adding valve 27 is made to burn in the exhaust passage or particulate filter 24. In another embodiment, fuel which is secondarily injected from the fuel injector 3 is burned in the combustion chambers 2, exhaust passage, or particulate filter 24.

In another embodiment, the PM removal control is comprised of $NO_X$ increase control which increases the amount of $NO_X$ in the exhaust gas which flows into the particulate filter 24 in order to oxidize and remove the particulate matter by oxidation using $NO_X$. To make the amount of $NO_X$ increase, for example, the amount of EGR gas is decreased. In still another embodiment, the PM removal control is comprised of ozone feed control which feeds ozone to the particulate filter 24 from an ozone feeder which is connected upstream of the particulate filter 24 in the exhaust passage in order to remove particulate matter by oxidation using ozone.

Next, the first allowable upper limit amount QPMNCZU and the second allowable upper limit amount QPMCZU will be explained.

Figure 12:
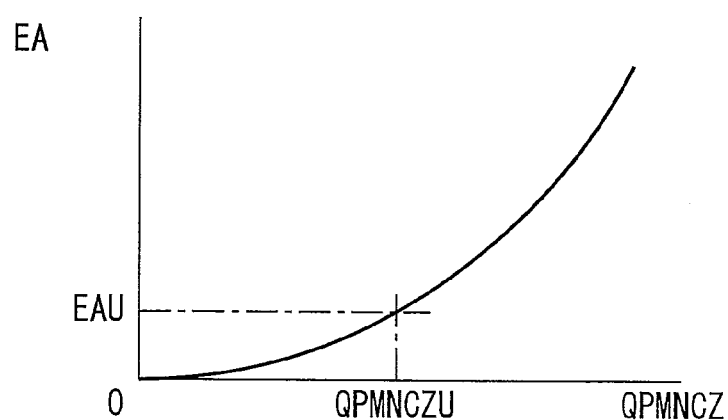
FIG. 12 is a graph which shows a relationship between an ash trapping rate EA of a particulate filter and a particulate matter trapped quantity QPMNCZ of a non-coated zones.

FIG. 12 shows the relationship between an ash trapping rate EA of the particulate filter 24 and the particulate matter trapped quantity QPMNCZ of the non-coated zones NCZ. The ash trapping rate EA is the ratio of the amount of ash which is trapped by particulate filter 24 to the amount of ash which flows into the particulate filter 24. As shown in FIG. 12, the ash trapping rate EA becomes higher the greater the particulate matter trapped quantity QPMNCZ. The above-mentioned first allowable upper limit amount QPMNCZU is set so that the ash trapping rate EA becomes the allowable upper limit value EAU. As a result, if the ash trapping rate EA increases up to the allowable upper limit value EAU, PM removal control is performed whereby the ash trapping rate EA falls. Therefore, the ash trapping rate EA is kept from increasing over the allowable upper limit value EAU.

Figure 13:
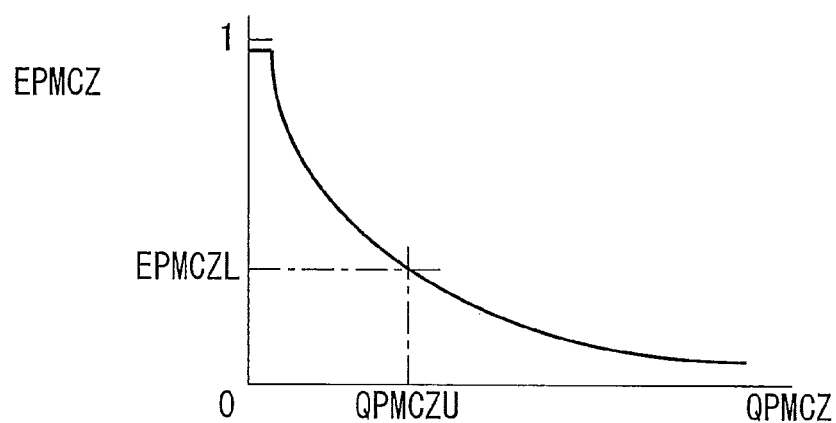
FIG. 13 is a graph which shows a relationship between a particulate matter trapping rate EPMCZ of the coated zones and a particulate matter trapped quantity QPMCZ of the coated zones.

FIG. 13 shows the relationship between the particulate matter trapping rate EPMCZ of the coated zones CZ and the particulate matter trapped quantity QPMCZ of the coated zones CZ. As shown in FIG. 13, the particulate matter trapping rate EPMCZ of the coated zones CZ becomes smaller along with the particulate matter trapped quantity QPMCZ becoming greater except when the particulate matter trapped quantity QPMCZ is extremely small. The second allowable upper limit amount QPMCZU is set so that the particulate matter trapping rate EPMCZ becomes the allowable limit value EPMCZL. As a result, if the particulate matter trapping rate EPMCZ falls to the allowable limit value EPMCZL, PM removal control is performed whereby the particulate matter trapping rate EPMCZ increases. Therefore, the particulate matter trapping rate EPMCZ is kept from falling below the allowable limit value EPMCZL.

Note that, the relationship between the particulate matter trapping rate EPMCZ of the coated zones CZ and the particulate matter trapped quantity QPMCZ of the coated zones CZ which are shown in FIG. 8 and FIG. 13 can change depending on the intake air amount Ga or temperature TF of the particulate filter 24. Therefore, in another embodiment, the particulate matter trapping rate EPMCZ of the coated zones CZ is corrected based on at least one of the intake air amount Ga and the temperature TF of the particulate filter 24. In still another embodiment, the second allowable upper limit amount QPMCZU is corrected by at least one of the intake air amount Ga and the temperature TF of the particulate filter 24.

Figure 14:
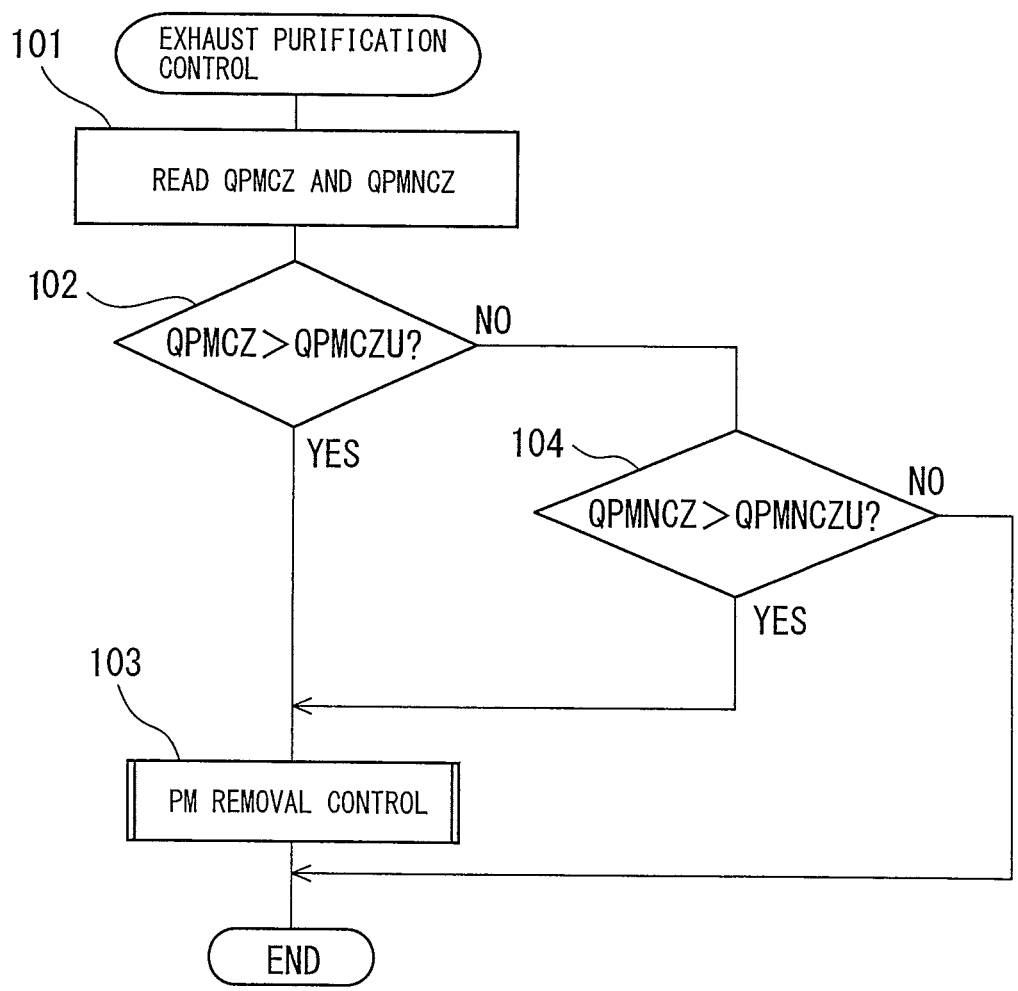
FIG. 14 is a flow chart which shows a routine for performance of exhaust purification control.
Figure 15:
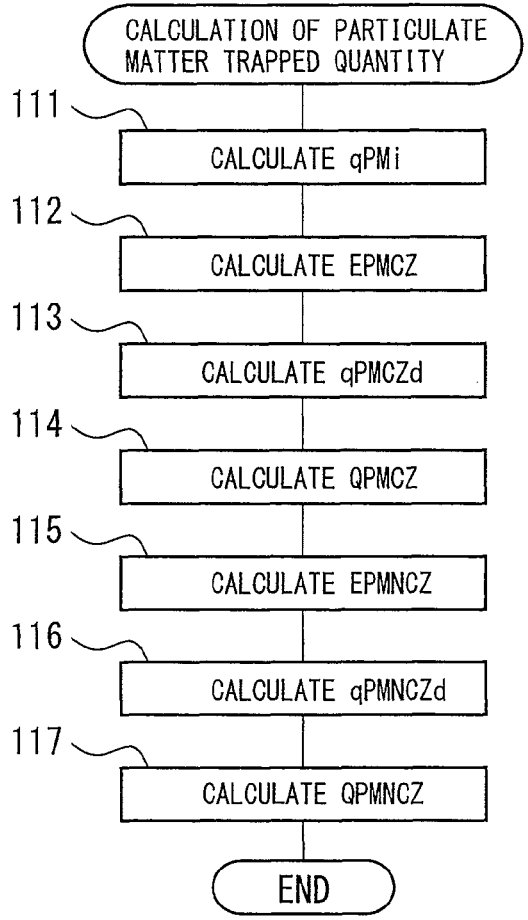
FIG. 15 is a flow chart which shows a routine for calculation of particulate matter trapped quantities QPMCZ and QPMNCZ.

FIG. 14 shows the routine for performing the exhaust purification control of the embodiment according to the present invention. Referring to FIG. 14, at step 101, the particulate matter trapped quantities QPMCZ and QPMNCZ which were calculated by the routine which is shown in FIG. 15 are read. At the following step 102, it is judged if the particulate matter trapped quantity QPMCZ of the coated zones CZ is greater than the second allowable upper limit amount QPMCZU. When QPMCZ>QPMCZU, next the routine proceeds to step 103 where PM removal control is performed. Next, the processing cycle is ended. As opposed to this, when QPMCZ≤QPMCZU, next the routine proceeds to step 104 where it is judged if the particulate matter trapped quantity QPMNCZ of the non-coated zones NCZ is greater than the first allowable upper limit amount QPMNCZU. When QPMNCZ>QPMNCZU, next the routine proceeds to step 103 where PM removal control is performed. As opposed to this, when QPMNCZQPMNCZU, the processing cycle is ended. In this case, PM removal control is not performed.

FIG. 15 shows a routine for performing control for calculation of the particulate matter trapped quantities QPMCZ and QPMNCZ of the embodiment according to the present invention. Referring to FIG. 15, at step 111, the quantity of particulate matter qPMi which flows into the particulate filter 24 per unit time is calculated by using FIG. 7. At the following step 112, the particulate matter trapping rate EPMCZ of the coated zones CZ is calculated based on the current particulate matter trapped quantity QPMCZ of the coated zones CZ by using FIG. 8. At the following step 113, the decrease qPMCZd per unit time of the particulate matter trapped quantity QPMCZ of the coated zones CZ is calculated using FIG. 9. At the following step 114, the particulate matter trapped quantity QPMCZ of the coated zones CZ is calculated using formula (1). At the following step 115, the particulate matter trapping rate EPMNCZ of the non-coated zones NCZ is calculated based on the current particulate matter trapped quantity QPMNCZ of the non-coated zones NCZ using FIG. 10. At the following step 116, the decrease qPMNCZd per unit time of the particulate matter trapped quantity QPMNCZ of the non-coated zones NCZ is calculated by using FIG. 11. At the following step 117, the particulate matter trapped quantity QPMNCZ of the non-coated zones NCZ is calculated by using the formula (2).

Figure 16:
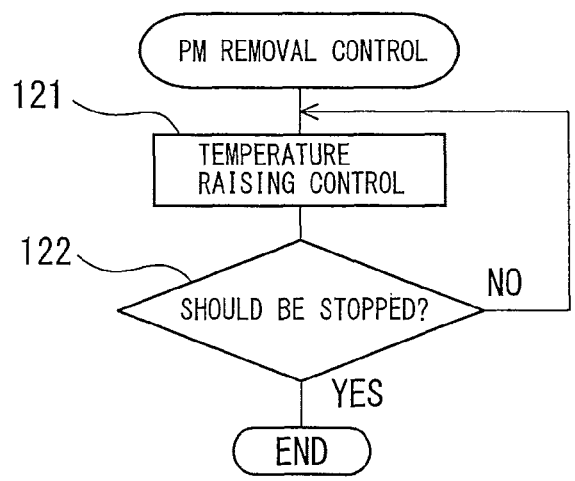
FIG. 16 is a flow chart which shows a routine for performance of PM removal control.

FIG. 16 shows a routine for performing PM removal control of the embodiment according to the present invention. This routine is executed at step 103 of FIG. 14. Referring to FIG. 16, at step 121, the above-mentioned temperature raising control is performed. At the following step 122, it is judged if the temperature raising control should be stopped. In the embodiment according to the present invention, when PM removal control is started due to the particulate matter trapped quantity QPMCZ of the coated zones CZ exceeding the second allowable upper limit amount QPMCZU, it is judged that PM removal control should be stopped when the particulate matter trapped quantity QPMCZ of the coated zone CZ becomes substantially zero. Further, when the particulate matter trapped quantity QPMNCZ of the non-coated zones NCZ exceeds the first allowable upper limit amount QPMNCZU and thereby PM removal control is started, it is judged that PM removal control should be stopped when the particulate matter trapped quantity QPMNCZ of the non-coated zones NCZ becomes substantially zero. When it is not judged that the temperature raising control should be stopped, the routine returns to step 121. As opposed to this, when it is judged that the temperature raising control should be stopped, the processing cycle is ended. Therefore, the temperature raising control is stopped.

The electronic control unit 30 (FIG. 1) is programmed to calculate the particulate matter trapped quantities QPMCZ and QPMNCZ. Further, the electronic control unit 30 is programmed to judge if the particulate matter trapped quantity QPMNCZ of the non-coated zones NCZ is greater than the first allowable upper limit amount QPMNCZU. Furthermore, the electronic control unit 30 is programmed to judge if the particulate matter trapped quantity QPMCZ of the coated zones CZ is greater than the second allowable upper limit amount QPMCZU. Furthermore, the electronic control unit 30 is programmed to perform PM removal control.

In the embodiments according to the present invention explained up to here, the non-coated zones NCZ are not provided with coated layers. In another embodiment, the non-coated zones NCZ are provided with another coated layers which are different from the coated layers 75. In this case, the average pore size of the partition walls 72 in the non-coated zones NCZ is set to 25μm to 100 μm in the state where the another coated layers are provided. The another coated layers are, for example, formed from catalytic coated layers which carry a metal which has an oxidation function. As a result, it is possible to easily remove by oxidation the particulate matter which reaches the non-coated zones NCZ.

REFERENCE SIGNS LIST 1 engine body
21 exhaust pipe
24 particulate filter
71$i$ exhaust gas inflow passages
71$o$ exhaust gas outflow passages
72 partition wall
75 coated layer
CZ coated zone
NCZ non-coated zone

The invention claimed is:
1. An exhaust purification device for an internal combustion engine which is provided with:

a particulate filter which is arranged inside of an engine exhaust passage for trapping particulate matter which is contained in exhaust gas, which particulate filter is provided with alternately arranged exhaust gas inflow passages and exhaust gas outflow passages and porous partition walls which separate these exhaust gas inflow passages and exhaust gas outflow passages from each other, wherein in each partition wall, a coated zone where a coated layer with an average pore size which is smaller than the average pore size of a partition wall substrate is used to cover the substrate surface and a non-coated zone at the downstream side of the coated zone and where the substrate surface is not covered by the coated layer are defined, and wherein the pore size of each partition wall is set so that the ash which is contained in the exhaust gas can pass through the partition wall in the non-coated zone, and an electronic control unit, the electronic control unit comprising:
a first calculator for calculating the quantity of particulate matter which is trapped at the non-coated zones,
a first judger for judging if a quantity of particulate matter which is trapped at the non-coated zones is greater than a first allowable upper limit amount, and
a PM remover for performing PM removal control which removes particulate matter from the particulate filter when it is judged that the quantity of particulate matter which is trapped at the non-coated zones is greater than the first allowable upper limit amount.

2. The exhaust purification device for an internal combustion engine according to claim 1, wherein said first calculator uses a quantity of particulate matter which flows into the particulate filter, a particulate matter trapping rate of the coated zones, a particulate matter trapping rate of the non-coated zones, and a quantity of particulate matter which is removed from the non-coated zones as the basis to calculate the quantity of particulate matter which is trapped at the non-coated zones.

3. The exhaust purification device for an internal combustion engine according to claim 1, wherein the electronic control unit further comprises a second calculator for calculating the quantity of particulate matter which is trapped at the coated zones, a second judger for judging if the quantity of particulate matter which is trapped at the coated zones is greater than a second allowable upper limit amount, and a second PM remover for performing PM removal control when it is judged that the quantity of particulate matter which is trapped at the coated zones is greater than the second allowable upper limit amount.

4. The exhaust purification device for an internal combustion engine according to claim 3, wherein said second calculator uses the quantity of particulate matter which flows into the particulate filter, the particulate matter trapping rate of the coated zones, and a quantity of particulate matter which is removed from the coated zones as the basis to calculate the quantity of particulate matter which is trapped at the coated zones.

5. The exhaust purification device for an internal combustion engine according to claim 1, wherein said coated layers are formed from metal particles which have an oxidation function.

6. The exhaust purification device for an internal combustion engine according to claim 1, wherein an average pore size of the partition wall substrates is set to 25μm to 100μm.

7. The exhaust purification device for an internal combustion engine according to claim 1, wherein an average size of particles which form said coated layers is set to 1μm to 10μm.

* * * * *